Figure 1:
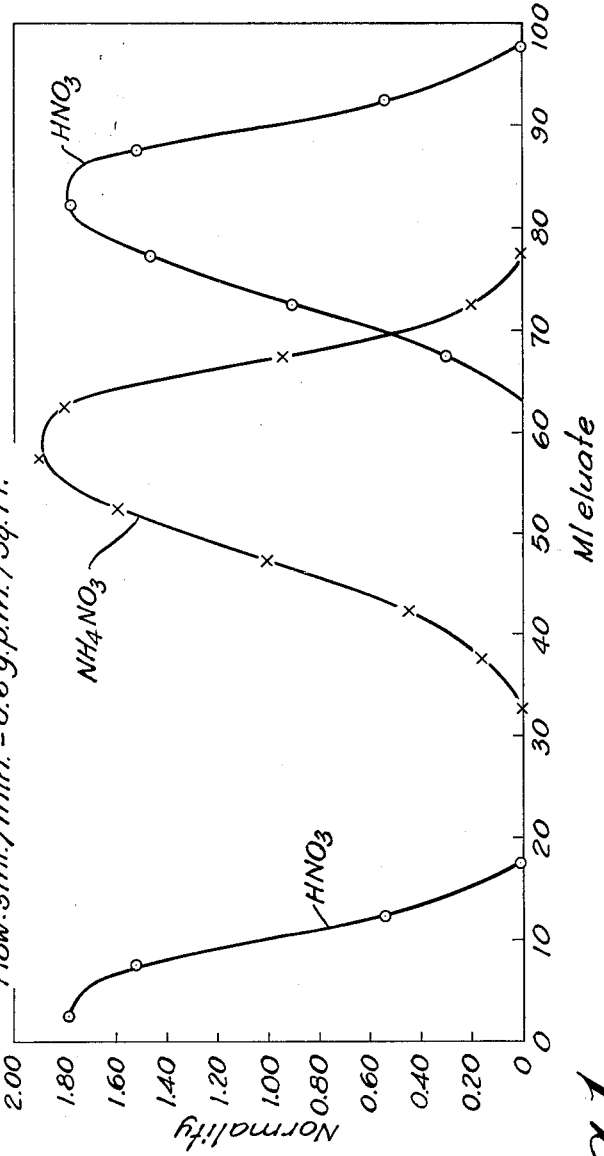

INVENTORS.
Melvin J. Hatch
John A. Dillon, Jr.
ATTORNEY

$HNO_3 - Ni(NO_3)_2$

Resin: Dowex 2, X8, 50-100, $NO_3^-$ form.
Bed: 90 ml.
Feed: 20 ml. solution $\begin{cases} 0.3\ N.\ Ni(NO_3)_2 \\ 0.35\ N.\ HNO_3 \end{cases}$
Rinse: 60 ml. D.I. $H_2O$
Pre-rinse: 3 complete feed-rinse cycles.
Flow-rate: ca. 3 ml./min. = ca. 0.6 g.p.m.
Temp.: Room temp.
Cuts: 5.0 ml. Points are average concentrations at mid-points of cuts.

3,099,529
SEPARATION OF NITRIC ACID FROM ITS SALTS
Melvin J. Hatch, Midland, and John A. Dillon, Jr., Coleman, Mich., assignors to The Dow Chemical Company, Midland, Mich., a corporation of Delaware
Filed Jan. 29, 1960, Ser. No. 5,438
7 Claims. (Cl. 23—102)

This invention concerns the separation of nitric acid from its salts using as the separating medium an anion exchange resin in the nitrate form.

It has been believed that all strong electrolytes, whether salts, acids, or bases, are "excluded" from cation or anion exchange resins in the ionic form common to the solution, whereas accompanying weakly ionized or non-ionized substances are absorbed into the resin. See, for example, U.S. Patent 2,684,331 for separations based upon this principle. Composite amphoteric ion-exchange resins have also been used to absorb strong electrolytes; Industrial and Engineering Chemistry, vol. 49 (November 1957): 1812 et seq.

It has now been discovered that nitric acid, which has an ionization constant of 23.5 and was not expected to be absorbed on anion exchange resins in the nitrate form, i.e., the anionic form common to that of nitric acid, in actuality is absorbed on such nitrate form anion exchange resins. The salts of nitric acid, however, are not absorbed to any appreciable extent on these resins. Consequently, good separations of nitric acid from its salts can be obtained merely by feeding a mixture of them in aqueous solution to an anion exchange resin column in the nitrate form, thereafter rinsing the column with water, advantageously distilled or deionized water, or with an aqueous solution of nitric acid having an acid concentration less than that of the feed, both hereinafter referred to as "an aqueous rinsing solution," and collecting successive portions of the effluent liquid, whereby the earlier fractions are enriched in nitrate salt relative to nitric acid and the later fractions are enriched in nitric acid relative to nitrate salt.

This process uses any of the known and commercially available anion exchange resins, and since it is as effective in many cases as processes employing the ion retardation resins (composite amphoteric ion-exchange resins), it is more practical in many cases. Suitable anion exchange resins useful in the practice of this invention include the resinous condensation products of phenol, formaldehyde and alkylene polyamines which are described in U.S. Patent No. 2,341,907; the nitrogen-containing resinous compositions comprising the reaction product of a primary or secondary amine and a halomethylated cross-linked copolymer of a monovinyl aromatic hydrocarbon and a divinyl aromatic hydrocarbon which are described in U.S. Patent No. 2,591,574; the strongly basic quaternary ammonium anion exchange resins comprising the reaction products of a tertiary amine and a halomethylated insoluble cross-linked vinyl aromatic resin such as the resinous compositions which are described in U.S. Patent Nos. 2,591,573 and 2,614,099; and the sulfonium anion exchange resins made by reacting a halomethylated cross-linked copolymer of a monovinylaryl hydrocarbon and a divinylaryl hydrocarbon with a dialkyl, a dihydroxyalkyl or an alkyl hydroxyalkyl sulfide. Such resins and their method of preparation are described in U.S. Patent 2,895,925, patented July 21, 1959. The strongly basic quaternary ammonium anion exchange resins are preferred.

By this process, inexpensive separation of nitrate salts from nitric acid can be realized using an aqueous rinsing solution as regenerant for the anion exchange resins. The separations which are possible as a result of the absorbability of the nitric acid on anion exchange resins in their nitrate form and the non-absorbability of nitrate salts thereon constitute a surprising discovery for which the explanation is not yet understood.

All conventional water-soluble nitrate salts, i.e., those having a solubility in water sufficient to warrant separaration, can be separated from nitric acid by this process. Of these, the metallic salts, both light and heavy metal salts, are especially of interest. Particularly useful are the separations of nitric acid from its aqueous solutions also containing heavy metal nitrates, particularly light transition element nitrates, i.e., nitrates of elements 21 through 28 in the periodic table. Those relatively few metals which form anionic complexes with nitric acid and are absorbed in anion exchange resins by an ion-exchange process are excluded from the scope of this invention.

In practice, an aqueous solution of nitric acid and one or more of its salts, which solution is at least 0.2 normal in such acid, is contacted preferably with a water-immersed bed of an anion exchange resin in the nitrate form with displacement from the resin bed of an equal volume of immersion liquid. Thereafter, an aqueous rinsing solution is introduced to displace and wash the residual solution from the resin bed. In instances wherein a water-hydrolyzable metal nitrate is present, the resin is preferably immersed in dilute nitric acid, e.g., ca. 0.2 normal or less to prevent hydrolysis. For the same reason, a dilute nitric acid rinsing solution e.g., ca. 0.2 normal, is used in separations involving such metal nitrates. The effluent liquor is collected as successive fractions whereby there are obtained effluent fractions containing nitrate salt as the principal solute and effluent fractions containing nitric acid as the principal solute. These cycles are repeated as desired. Alternatively, a conventional continuous process can be used. It is necessary that the feed solutions so treated be at least 0.2 normal in nitric acid, since otherwise the nitrate form of the resin will not absorb nitric acid sufficiently to yield significant separation from the metal nitrate in the manner described. The process is usually carried out at room temperature or substantially room temperature, at atmospheric pressure and at temperatures up to about 90° C. but below a temperature harmful to the anion exchange resin.

The following examples illustrate specific embodiments and the best mode contemplated for carrying out the inventive process. They are not to be considered limitative of the invention as claimed.

*Example 1*

A 100 ml. 0.5 in. I.D. glass burette was filled with water-immersed Dowex 1 resin, a granular strongly basic quaternary ammonium anion exchange resin. The anion exchange resin was the reaction product of trimethylamine and an insoluble resinous chloromethylated copolymer of approximately 87.5 weight percent styrene, 4.5 percent ar-ethylvinylbenzene and 8 percent divinylbenzene. The resin was in the form of rounded granules 50–100 U.S. mesh size. The anion exchange resin was equilibrated with three complete feed-rinse cycles of a feed of 20 ml. of an aqueous solution 1.60 normal in nitric acid and 2.15 normal in ammonium nitrate followed by a rinse of 60 ml. of deionized water. Thereafter, the feed-rinse cycle was repeated with concentrations of feed as indicated and rinse of deionized water. Concentrations of nitric acid and ammonium nitrate were determined in successive 5 ml. cuts of eluate. A flow rate of 3 ml./min. (0.6 gal./min./ft.$^2$) was used. Results are given in FIG. 1, wherein the points represent average concentrations at midpoints of the cuts.

*Example 2*

Figure 2:
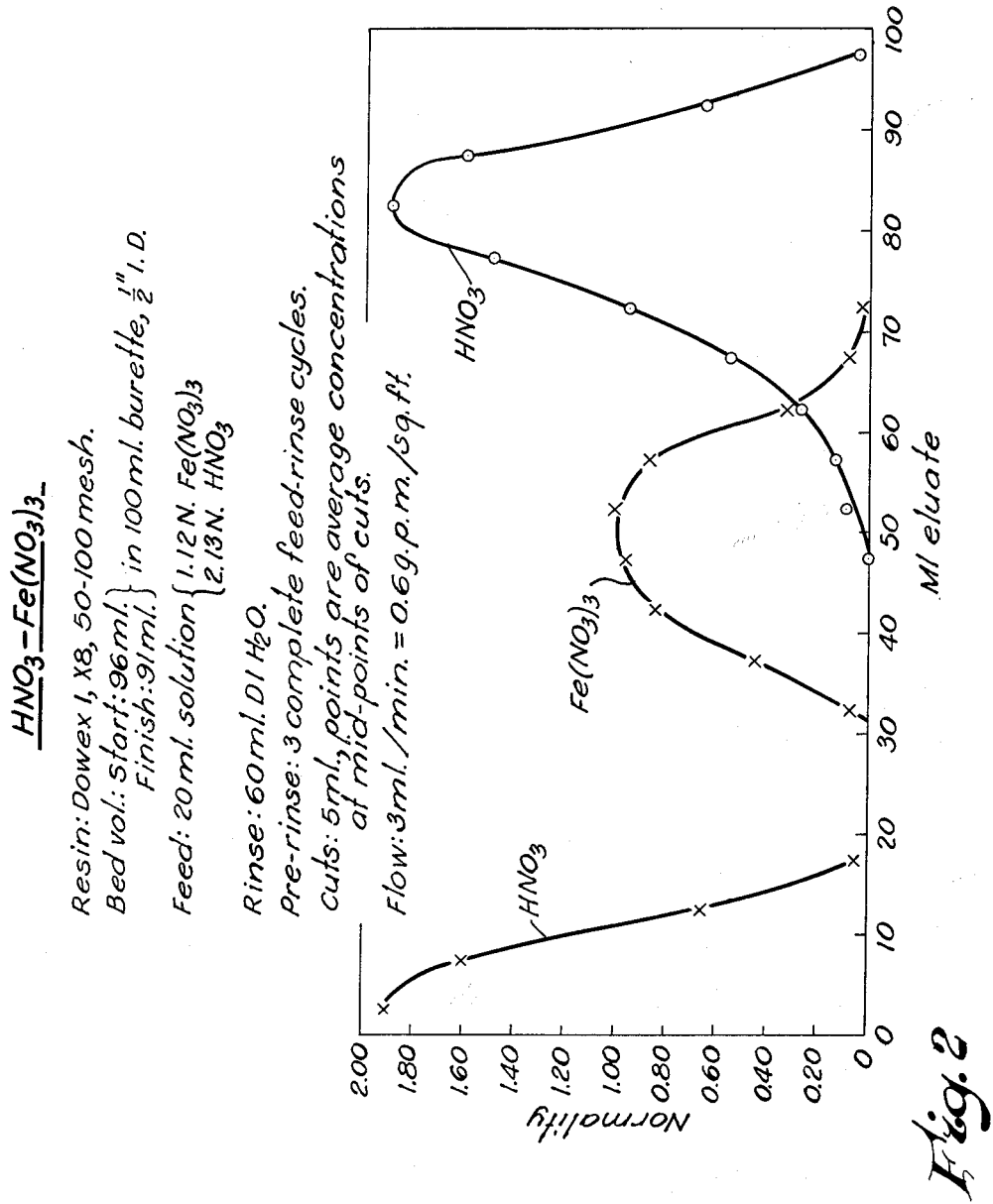

The procedure of Example 1 was repeated with a feed of 20 ml. of an aqueous solution 2.13 normal in nitric acid and 1.12 normal in ferric nitrate. Results are given in FIG. 2.

*Example 3*

Figure 3:
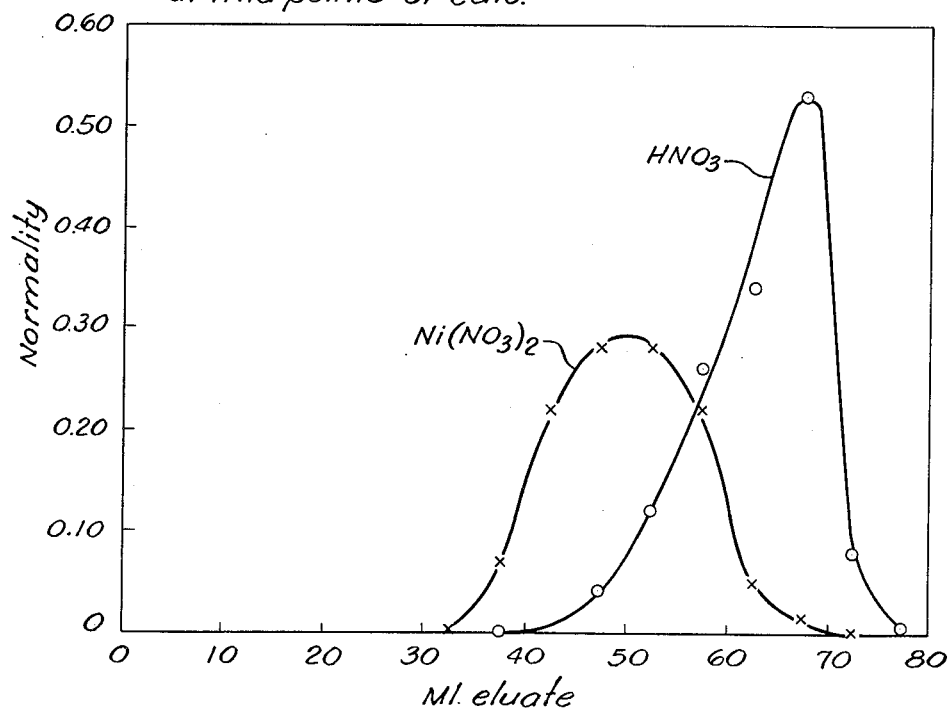

The procedure of Example 1 was repeated with a feed of 20 ml. of an aqueous solution 0.35 normal in nitric acid and 0.3 normal in nickel nitrate after the bed had been equilibrated with three complete feed-rinse cycles. Results are given in FIG. 3. In this example, Dowex 2 resin in the nitrate form was used. It differs from the resin of Example 1 in that dimethylethanolamine is substituted for trimethylamine in the resin preparation.

What is claimed is:

1. A method for separating from one another nitric acid and a member of the group consisting of ammonium nitrate, water-soluble metal nitrate salts free from anionic complexes with nitric acid and mixtures thereof by feeding to a bed of an anion exchange resin in the nitrate form immersed in an aqueous liquid of the group of water and a dilute aqueous solution of nitric acid having an acid concentration less than that in the feed solution, an aqueous solution of said acid and said salt which solution is at least 0.2 normal in nitric acid, thus displacing aqueous liquid from the resin bed, thereafter feeding an aqueous rinsing solution of the group consisting of water and dilute nitric acid having a nitric acid concentration less than that of the feed to the bed to displace a further amount of residual liquid from the bed, and collecting successive fractions of the displaced effluent liquid whereby there is obtained an early fraction of the effluent liquid which contains a higher ratio of said salt to said acid than is in the starting solution and a later fraction of the effluent liquid which contains a higher ratio of said acid to said salt than is in the starting solution.

2. Method of claim 1 wherein the anion exchange resin is a strongly basic quaternary ammonium anion exchange resin.

3. Method of claim 1 wherein the salt is ammonium nitrate.

4. Method of claim 1 wherein the salt is ferric nitrate.

5. Method of claim 1 wherein the salt is nickel nitrate.

6. Method of claim 1 wherein the salt is a heavy metal nitrate.

7. Method of claim 1 wherein the salt is a light transition metal nitrate.

References Cited in the file of this patent

FOREIGN PATENTS 781,726      Great Britain _____ Aug. 21, 1957